United States Patent [19]

Juda

[11] Patent Number: 4,661,425

[45] Date of Patent: Apr. 28, 1987

[54] LITHIUM HYDRIDE ANODE FOR USE IN ALKALINE BATTERIES

[75] Inventor: Walter Juda, Lexington, Mass.

[73] Assignee: Prototech Company, Newton Highlands, Mass.

[21] Appl. No.: 688,079

[22] Filed: Dec. 31, 1984

[51] Int. Cl.[4] .................... H01M 4/40; H01M 10/24
[52] U.S. Cl. .................................. 429/206; 429/218
[58] Field of Search ............................. 429/206, 218

[56] References Cited

U.S. PATENT DOCUMENTS 3,791,871  2/1974  Rowley ............................. 429/218

OTHER PUBLICATIONS

Jasinski, High-Energy Batteries, Plenum Press, New York, 1967, p. 113.
Kemp et al, Design and Performance Features of a 0.45 kW, 4 kWh Lihium-Water Marine Battery, 11th IECEC, State Line, Uev. USA, Sep. 12-17, 1976, pp. 462-466.

Primary Examiner—Donald L. Walton
Attorney, Agent, or Firm—Rines and Rines, Shapiro and Shapiro

[57] ABSTRACT

This invention is concerned with lithium hydride as an anode component in an aqueous alkaline battery.

2 Claims, No Drawings

LITHIUM HYDRIDE ANODE FOR USE IN ALKALINE BATTERIES

The present invention relates to a novel light weight anode for use in alkaline batteries, being more particularly, though not exclusively, directed to the substantial enhancement of the energy density of such aqueous and expendable (i.e. primary) batteries.

A lithium metal anode has been and is being investigated for use in high energy density aqueous alkaline batteries, for example an aqueous lithium-air battery designed for short missions (of the orders of hours).

In the Li-air battery the electrode and cell reactions are shown in equations 1, 2 and 3.

$$\text{Anode: } 2\text{Li} \rightarrow 2\text{Li}^+ + 2e \quad (1)$$

$$\text{Cathode: } \tfrac{1}{2}\text{O}_2 + \text{H}_2\text{O} + 2e \rightarrow 2\text{OH}^- \quad (2)$$

$$\text{Overall: } 2\text{Li} + \text{H}_2\text{O} + \tfrac{1}{2}\text{O}_2 \rightarrow 2\text{Li}^+ + 2\text{OH}^- \quad (3)$$

Part of the lithium anode, usually in excess of 20%, is "lost" due to the parasitic reaction.

$$\text{Li} + \text{H}_2\text{O} \rightarrow \text{Li}^+ + \text{OH}^- + \tfrac{1}{2}\text{H}_2. \quad (4)$$

Here, the "weight and volume energy densities are severely limited by the need to carry water as well as excess lithium.

It is an object of the invention to provide a novel lithium hydride-containing anode of improved performance.

Other and further objects will be explained hereinafter and are more particularly delineated in the description to follow a preferred or best mode embodiment and in the appended claims.

In summary, from one of its viewpoints, the invention embraces an aqueous alkaline battery containing an anode comprising a lithium hydride layer.

Lithium hydride, LiH, is a known electrolyte prepared, for example, by direct reaction between lithium metal and hydrogen gas; it is composed of the lithium cation ($Li^+$) and the hydrogen anion ($H^-$). It has been used as the anode in a molten LiCl-KCl battery at 380° C. in combination with a silver-calcium chromate cathode (High-Energy Batteries by Raymond Jasinski, Pienum Press, New York, 1967, page 113). It is a salt which is solid at ambient temperature and reacts rapidly and completely with water in accordance with $$\text{LiH} + \text{H}_2\text{O} \rightarrow \text{Li}^+ + \text{OH}^- + \text{H}_2 \quad (5)$$

Thus previous experience with lithium hydride in an aqueous medium would contra-indicate the discovery underlying the present invention, involving its surprising utility as an anode in substitution for lithium metal in alkaline aqueous batteries. Indeed, the facts that solid lithium hydride is electrically resistive and that it decomposes rapidly in the presence of water (see above) (where it would be considered merely a source of hydrogen)—would lead one away from a consideration that it might be adapted to become a battery anode producing an open cell voltage (vs oxygen) in excess of that produced by hydrogen.

In contrast to lithium metal, lithium hydride can liberate, in as aqueous alkaline twice as many electrons (two), a factor that makes it attractive for a substantially increased weight energy density, provided that it can also be operated at sufficiently high voltages. Moreover, LiH (spec. gravity 0.78 g/cc) is almost 50% denser than Li metal (spec. gravity: 0.534), thereby substantially increasing the volume energy density.

Such has been surprisingly discovered to be possible by melting about 5 grams of the lithium hydride (in the absence of water) at 680° C., in an nitrogen atmosphere as a layer on a highly conductive foil of silver (or other conductor such as nickel and the like) and contacting the same with an aqueous solution of 15 molar NaOH. Under these circumstances, very slow decomposition of the lithium hydride layer to hydrogen has been observed, so that the bulk of the hydride release two electrons per hydrogen anion, thereby being oxidized to $H^+$ as is required for anodic battery operation. Experimentally an open cell potential of 1.3 volt and higher has been obtained with an air cathode in 15 molar sodium hydroxide at ambiant temperature, demonstrating that the lithium hydride is indeed the anode; a hydrogen air fuel cell can produce open cell voltages of significantly less than 1.23.

Modifications will occur to those skilled in this art, and such are considered to fall within the spirit and scope of the invention as defined in the appended claims.

What is claimed is:

1. In a battery comprising an aqueous alkaline electrolyte, an anode comprising a lithium hydride layer in contact with a current collector, said aqueous electrolyte being sufficiently concentrated so as to minimize the decomposition of said lithium hydride layer to hydrogen.

2. The combination of claim 1, wherein said solution is about at least 15 molar sodium hydroxide.

* * * * *